Feb. 23, 1937. H. L. TIGER 2,071,990
STANDARDIZING WATER FOR CARBONATED BEVERAGES
Filed Dec. 26, 1934
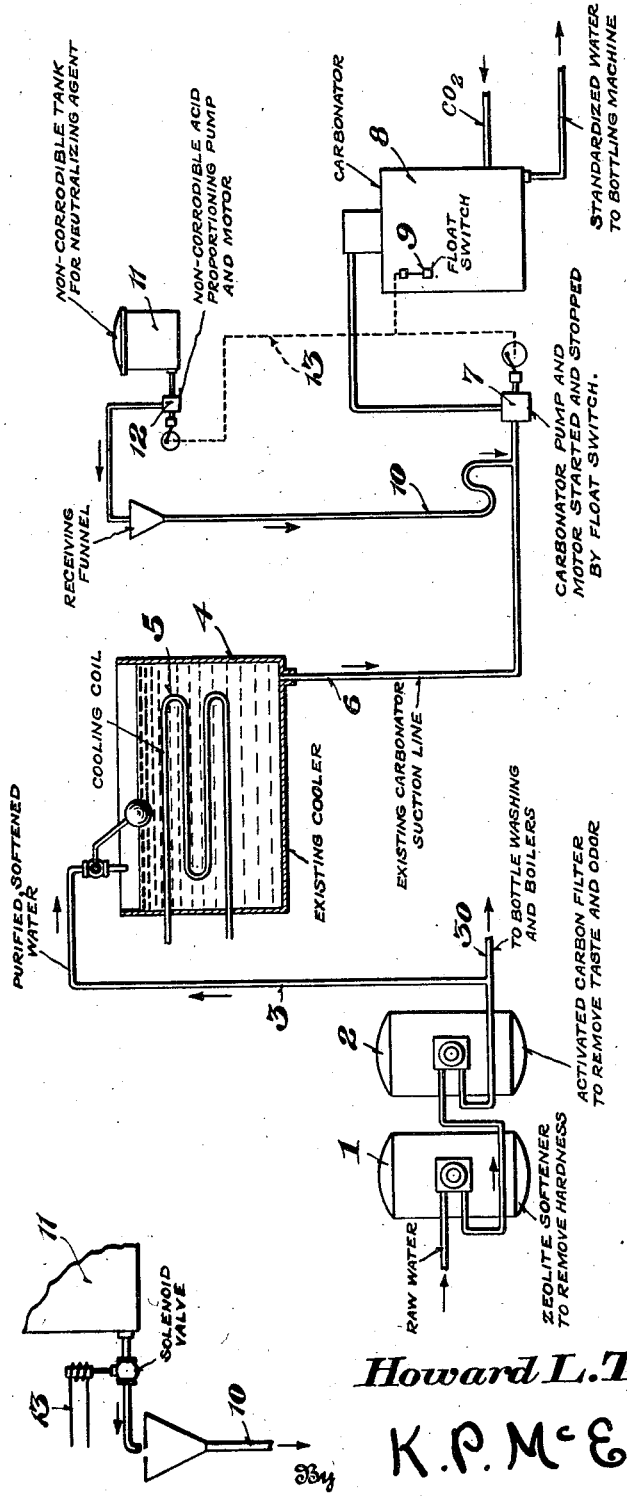
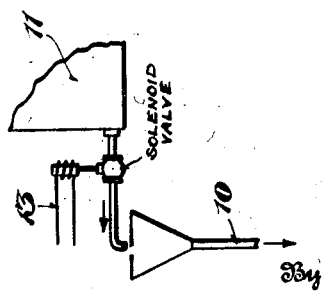
Inventor
Howard L. Tiger,
By K. P. McElroy
Attorney Patented Feb. 23, 1937

2,071,990

UNITED STATES PATENT OFFICE 2,071,990

STANDARDIZING WATER FOR CARBONATED BEVERAGES

Howard L. Tiger, New York, N. Y., assignor to The Permutit Company, New York, N. Y., a corporation of Delaware Application December 26, 1934, Serial No. 759,309

8 Claims. (Cl. 99—28)

This invention relates to standardizing water for carbonated beverages; and it comprises a method wherein prior to carbonation a beverage acid is added to water containing bicarbonate basicity in an amount just insufficient to impart a perceptible sour taste, this point when using one or more of the usual beverage acids corresponding usually to a residual basicity somewhere between 40 and 90 parts per million calculated as $CaCO_3$ as determined by titration with sulfuric acid using methyl orange; and it also comprises the provision in a beverage bottling assemblage having the usual water softening equipment delivering softened water through a cooler to a carbonator, supply being under pump pressure and controlled by float means in the carbonator, of means for delivering small and measured amounts of a solution of a beverage acid to the flow of softened water between the cooler and the pump, additions being controlled by said float; all as more fully hereinafter set forth and as claimed.

Nearly all water contains basicity in one form or another. All artificially softened waters contain sodium carbonate, usually as bicarbonate derived from calcium or magnesium bicarbonate contained in the raw hard water. A water containing bicarbonate usually contains some $CO_2$ in excess. Zeolite softened water contains sodium bicarbonate. Water softened with lime-soda is free of $CO_2$ and may have a caustic alkalinity at first but it rapidly picks up $CO_2$ from the air and its soda then exists as bicarbonate. In these softened waters the amount of sodium carbonate is usually too little to produce any appreciable alkaline taste; the taste being conditioned more by the associated $CO_2$.

In the manufacture of the usual types of carbonated bottled beverages it is customary to prepare a sirup flavoring of standard character as a stock, the composition of this sirup being always accurately adjusted. This sirup is added to water and carbonated with $CO_2$ under pressure, the water being usually softened prior to carbonation. Sometimes the proportion of sirup is about one part by volume to 5 volumes of water. Many of these sirups are made with an acid taste or "tang" and the taste is a matter of great importance in making standard bottled beverages. Absolute uniformity in taste is desirable.

On diluting the sirup with artificially softened water in the usual practice there is often enough sodium carbonate present to affect this acid taste or tang. While the amount of base in the water is, as stated, very little, there is often enough to affect and change a delicately balanced acid taste. The beverage may lose its tang upon standing and become altered in taste.

In the present invention this source of inconvenience is removed by adding to the water prior to carbonation an amount of beverage acid just sufficient to reduce the basicity to a standard residual amount and insufficient to allow an acid taste to appear. More or less acid will affect the taste of the beverage subsequently made. Water standardized in this way has no effect upon the acid taste of subsequently added sirup. I may use any of the ordinary beverage acids, such as phosphoric acid and the fruit acids, citric, tartaric, malic acid, etc. Lactic acid is also adapted. Generally however, I use the same acid as that used in making the beverage sirup, making a solution of the commercial acid at a convenient dilution, say 1 to 4 per cent.

Dilute phosphoric acid upon neutralization is distinctly acid up to and somewhat beyond the point where added NaOH is in amount sufficient to produce monosodium phosphate. At this point, methyl orange indicates neutrality.

Between monosodium phosphate and disodium phosphate the change in reaction is gradual, the first being acid and the second distinctly alkaline. There is no sharp point as in forming monosodium phosphate. The pH point where an acid taste just disappears is around 6.0. The pH is not a wholly reliable indication as it is influenced by the presence of $CO_2$ as well as by the equilibrium between $NaH_2PO_4$ and $Na_2HPO_4$. A taste equilibrium in the water used for carbonation is shifted again slightly to the acid side when a high concentration of $CO_2$ is imposed in bottling. The fruit acids, citric, tartaric, etc., act similarly to phosphoric in neutralizing carbonates.

On adding phosphoric acid to a dilute solution of sodium bicarbonate, sodium phosphates are formed, $CO_2$ is liberated and complex equilibria result; equilibria between monosodium phosphate and disodium phosphate and between $CO_2$ and both. In a solution of disodium phosphate, $CO_2$ tends to produce an equilibrium amount of monosodium phosphate. As an empirical matter it is found that when the addition of phosphoric acid is stopped at a point where a water displays a certain amount of residual basicity, titrating with methyl orange and sulfuric acid, the water no longer produces any change in the acid taste after carbonation and addition of sirup; the amount of residual basicity giving best results in most cases having been found to be the equivalent of about 85 parts $CaCO_3$ per million of water (85 milligrams per liter).

Experience has shown that good results are obtained when the beverage water is left after the addition of acid with a residual apparent basicity-acidity reaction corresponding to about 6.0 pH. The residual basicity is conveniently determined by using standard sulfuric or hydrochloric acid with methyl orange or another indicator of the same class, such as Congo red. This indicates the basicity remaining available for neutralizing acids. It has been found by practical experience in making the common carbonated beverages that when a titration of the water in this manner gives an apparent basicity equivalent to about 80 to 90 parts $CaCO_3$ per million, (130 to 150 ppm. sodium bicarbonate) the water is tasteless, so far as acidity is concerned and in admixture with sirup of the usual acidity gives no change in taste in the usual dilutions of 5:1 and thereabouts under the usual $CO_2$ pressure used in bottling. The test does not discriminate between the basicity due to residual bicarbonate and that due to basic compounds of the added acid. This is, however, immaterial.

Considerable leeway is permissible with different beverages as to tolerance for residual basicity. In general this should not be below 40 nor above 90 parts per million as $CaCO_3$. It has been found that water of the stated apparent residual basicity gives a non-taste-developing, tasteless water regardless of whether phosphoric acid or fruit acids or lactic acid is used for partial neutralization of natural basicity. Carbonated beverages made from this acid treated water do not lose their acid tang on standing nor become altered in taste. Residual basicity appears to act with the added $CO_2$ in maintaining the desired uniform tang.

In the present invention this discovery is utilized, the beverage water being passed through a cooler of the usual type employed in beverage factories and thence into a carbonator. The water is generally softened and treated with activated carbon prior to cooling to remove possible foreign tastes and odors. Intermediate the cooler and the carbonator I add a modicum of neutralizing acid solution such as phosphoric acid. To dilute acid solution is added continuously to the flowing water going from the cooler to the carbonator. The proportion added is such that the treated water on titration displays an apparent basicity equal to 130 to 150 parts per million of $NaHCO_3$. A solution of citric acid, of tartaric acid, of malic acid or of lactic acid may be added in the same way and the end point ascertained in a similar manner. Monosodium phosphate itself is a substance of a pleasant acid taste, often used in beverages and as it is easily available commercially it may be employed in the present invention in lieu of phosphoric acid, the commercial preparation being dissolved in water to a convenient concentration. In some cases the added phosphate content improves the carbonated beverage flavor.

Natural hard water is usually softened for use in making beverages, and the taste effect of softened water is readily standardized with resulting improvement and uniformity in the beverage flavor. However, natural hard water is sometimes used in beverage making and this can also be standardized to a residual basicity maintaining a uniform flavor in the finished beverage.

As a rule in these beverage plants, the feeding of softened, cooled water to the carbonator is governed by a float switch in the latter; this float switch controlling a pump working against the pressure of the carbonator. In what I regard as the best embodiment of my invention, the same float switch in the carbonator controls an acid feeding mechanism, the feeding of acid being thereby proportioned to the flow of water.

In the accompanying drawing I have shown, more or less diagrammatically, an apparatus embodiment of the present invention.

In this showing the view in Fig. 1 is partly in elevation and partly in vertical section of a complete, diagrammatically shown installation. Fig. 2 shows an alternative form of acid feed control. The legends on the drawing indicate the functions of the several elements. Water coming from a suitable source enters element 1, a zeolitic softener. Other softeners may be employed in its lieu. Leaving the softener, the water flows through an activated carbon filter 2, whence part of the flow goes through line 3 to the carbonating system, the rest of the water passing through line 30 for miscellaneous use as in bottle washing means, boilers, etc. The portion of water to be used for carbonation flows through tank 4 containing cooling coils 5 and thence through line 6 and pump 7 to carbonator 8. In the carbonator is a diagrammatically shown float switch 9 controlling the operation of the pump motor in a well understood way. All these elements are usual and customary in beverage factories. But, as shown, I place on the suction side of the pump an acid feeding line 10 receiving the supply of dilute beverage acid from stock tank 11 through pump 12 with a motor governed by an electrical control line 13 running from the float switch 9. The flow of softened water from the cooler is controlled by the float switch and the introduction of acid is also controlled by the float switch; the flows of acid and water being thus coordinated and synchronized in the desired proportions. The output of pump 12 may be adjusted in well known ways.

If desired, the pump 12 may be replaced by other suitable feeding mechanism which can be set to discharge the neutralizing solution at a constant predetermined rate when in operation and which can be automatically stopped and started in synchronism with pump 7. For example, this synchronization can be effected by means of an adjustable orifice feed with an electrically operated valve 9 such as a solenoid valve located in the orifice feed outlet line, said valve being actuated by the carbonated float switch. Such an organization is illustrated in Fig. 2.

What I claim is:—

1. In the preparation of carbonated beverages from water containing carbonate basicity, a process which comprises standardizing the water prior to carbonation by adding continuously thereto a dilute beverage acid in a regulated amount sufficient to neutralize a portion but not all of the carbonate basicity of the water and to leave a residual apparent basicity maintaining the beverage flavor.

2. The process of claim 1 wherein the added acid is phosphoric acid.

3. The process of claim 1 wherein the added acid is a fruit acid chosen from the group, citric, tartaric and malic acids.

4. The process of claim 1 wherein the added acid is lactic acid.

5. The process of claim 1 wherein the acid solution leaves a residual apparent basicity of 40 to 90 parts per million calculated as $CaCO_3$.

6. In the preparation of a carbonated beverage from artificially softened water containing sodium bicarbonate alkalinity, a method of keeping the beverage flavor uniform which comprises standardizing the softened water prior to carbonation by adding to the water a dilute beverage acid in the proportion required to neutralize a portion of the alkalinity and to leave a residual alkalinity equivalent to between 40 to 90 parts per million calculated as $CaCO_3$.

7. In beverage making plants utilizing water containing carbonate basicity for making carbonated beverages, the combination with the usual cooler and the usual carbonator of a device for adding measured small amounts of a beverage acid located intermediate the cooler and the carbonator and controlled by the flow of water to the carbonator.

8. In the apparatus of claim 7 wherein the flow of water to the carbonator is controlled by a float in the carbonator governing a pump, means for controlling the flow of acid by the float in the carbonator.

HOWARD L. TIGER.